H. T. DAVIS.
Churns.

No. 198,797. Patented Jan. 1, 1878.

ATTEST:
Robert Burns.
Chas. Hall

INVENTOR:
Henry T. Davis,
By Knight & Bro.
Attys.

UNITED STATES PATENT OFFICE.

HENRY T. DAVIS, OF SHERMAN, TEXAS.

IMPROVEMENT IN CHURNS.

Specification forming part of Letters Patent No. 198,797, dated January 1, 1878; application filed May 29, 1877.

*To all whom it may concern:*

Be it known that I, HENRY T. DAVIS, of Sherman, Grayson county, Texas, have invented certain new and useful Improvements in Churns, of which the following is a full, clear, and exact description, reference being had to the accompanying drawings, forming part of this specification.

My improvement applies, first, to downward extensions from the lid to prevent revolution of the cream; and, secondly, to the joint between the dasher-rod and the two parts of the head.

The dasher has upon the staff two inclined bars put on, in the form of a Greek cross, so as to give to the cream that they come in contact with a downward or upward movement, according to the direction of rotation given to the dasher-rod.

The lid of the churn is made in two semicircular segments, and from each depends one or more boards, which enter the cream and check its revolution in the vessel.

The bearing of the dasher rod or shaft is by a collar upon the rod, which is rabbeted upon the lower side to fit the blocks upon the two parts of the lid. The collar not only serves to support the dasher-shaft, but serves to hold the two parts of the lid together.

Figure 1:
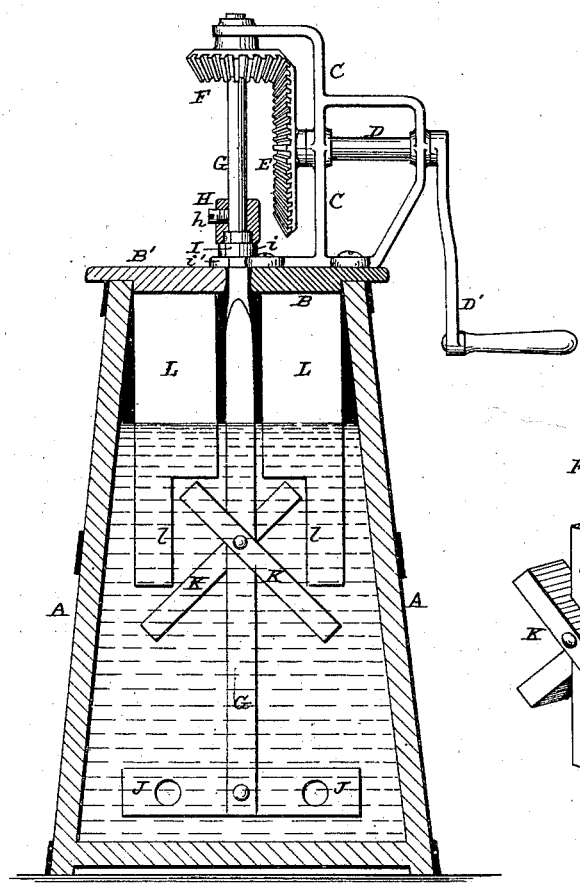
Figure 3:
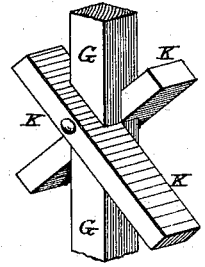
Figure 2:
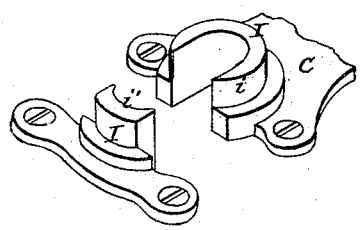

In the drawings, Figure 1 shows the churn in axial section. Fig. 2 is a detail perspective view of dasher-bearing. Fig. 3 is a detail perspective view of part of dasher.

A is the cream-vessel, having a lid formed of two sections, B B', upon one of which, B, is erected the bearing-frame C of the crank-shaft D, turned by a crank, D'. Upon the shaft D is a bevel cog-wheel, E, which engages a bevel-wheel, F, on the top of the dasher-shaft G. The said shaft has its bearing in the frame C. H is a collar upon the dasher-shaft, secured by a set-screw, h, and having at the lower side a circular recess, which fits on the rabbeted top of the bearing-block I. This block consists of two parts, i i', the former of which forms part of the base-bar of frame C, and the latter, i', is attached to the part B' of the lid. The parts i i' fit together, as shown, (see them shown detached in Fig. 2,) and form a collar freely fitting the shaft G. The dasher rod or staff has at bottom a horizontally-extending dasher, J, and has above the said dasher inclined dashers K K, whose broader sides are upon the top and bottom, so that as the dasher-rod is turned the dashers K K cause a strong vertical current in the cream at the central part of the churn, the cream at the other parts being also caused to move in supplying this vertical current.

The position of these dashers K K and their construction are so plainly shown in Figs. 1 and 2 that no further explanation is necessary.

Depending from the lid are boards L L, of which there may be one, two, or more. The lower ends of these boards extend down into the cream beside the dasher K K, and as their breadth is radial to the churn they oppose the formation of a rotary movement of the cream. These boards are cut away at l, to allow the revolution of the dasher K K.

I claim herein as new and of my invention—

1. The combination, with a churn-dasher, of the lid B B', provided with depending boards L L, having recesses l l, as and for the purpose set forth.

2. The dasher consisting of shaft G and crossed bars K K, in combination with recessed boards L l L l, depending from the lid, as and for the purpose set forth.

3. The combination of lid B B', blocks I, composed of two parts, i i', collar H, and dasher-shaft G, substantially as set forth.

HENRY T. DAVIS.

Witnesses:
SAML. KNIGHT,
A. N. SIMPSON.